(12) United States Patent
Markfort (10) Patent No.: US 8,230,964 B2
(45) Date of Patent: Jul. 31, 2012

(54) STEERING DEVICE FOR A MOTOR VEHICLE, HAVING A STEERING WHEEL, A STEERING SHAFT AND A SUPERPOSITION GEARING

(75) Inventor: Dieter Markfort, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/865,832

(22) PCT Filed: May 14, 2009

(86) PCT No.: PCT/EP2009/055846
§ 371 (c)(1),
(2), (4) Date: Aug. 2, 2010

(87) PCT Pub. No.: WO2009/138462
PCT Pub. Date: Nov. 19, 2009

(65) Prior Publication Data
US 2011/0088963 A1    Apr. 21, 2011

Related U.S. Application Data

(60) Provisional application No. 61/060,373, filed on Jun. 10, 2008.

(30) Foreign Application Priority Data

May 15, 2008   (DE) .......................... 10 2008 023 759

(51) Int. Cl.
*B62D 5/04*    (2006.01)
(52) U.S. Cl. .......................... 180/444; 180/443; 180/446
(58) Field of Classification Search .................. 180/443, 180/444, 446
See application file for complete search history.

(56) References Cited

U.S. PATENT DOCUMENTS

| | | | |
|---|---|---|---|
| 4,796,482 A | | 1/1989 | Hiramitsu et al. |
| 6,053,270 A | * | 4/2000 | Nishikawa et al. ........... 180/168 |
| 6,817,457 B2 | | 11/2004 | Monahan et al. |

(Continued)

FOREIGN PATENT DOCUMENTS

DE    36 19 340 A1    12/1983

(Continued)

OTHER PUBLICATIONS

Notification concerning Transmittal of International Preliminary Report on Patentability (Chapter I of the Patent Cooperation Treaty) from the International Bureau of WIPO for International Application No. PCT/EP2009/055846 dated Nov. 17, 2010, 7 pages.

*Primary Examiner* — Lesley D. Morris
*Assistant Examiner* — Marc Scharich
(74) *Attorney, Agent, or Firm* — Fitch Even Tabin & Flannery, LLP (57) ABSTRACT

A steering device for a motor vehicle is provided. The steering device has a steering wheel, having a steering shaft and having a superposition gearing which is arranged in or on the steering wheel and which is designed to transmit a motor-driven adjusting movement to the steering shaft. In one form, at least one interface is provided which, in the presence of a defined condition, separates or limits a transmission of force between the steering shaft and the superposition gearing. The interface is for example an overload clutch.

22 Claims, 7 Drawing Sheets

U.S. PATENT DOCUMENTS

| | | | |
|---|---|---|---|
| 7,648,004 B1* | 1/2010 | Larouche et al. | 180/443 |
| 8,002,075 B2* | 8/2011 | Markfort | 180/443 |
| 2006/0042861 A1* | 3/2006 | Ovshinsky | 180/443 |
| 2006/0149446 A1* | 7/2006 | Nelson | 701/41 |
| 2008/0141814 A1 | 6/2008 | Markfort | |
| 2008/0277190 A1* | 11/2008 | McCord et al. | 180/444 |
| 2011/0056762 A1* | 3/2011 | Markfort | 180/444 |

FOREIGN PATENT DOCUMENTS

| | | |
|---|---|---|
| DE | 297 12 842 U1 | 10/1997 |
| DE | 101 60 313 A1 | 3/2003 |
| JP | 2003-176839 A | 6/2003 |
| WO | 2007/009420 A1 | 1/2007 |

* cited by examiner

STEERING DEVICE FOR A MOTOR VEHICLE, HAVING A STEERING WHEEL, A STEERING SHAFT AND A SUPERPOSITION GEARING

CROSS-REFERENCE TO RELATED APPLICATIONS

This application is a National Phase Patent Application of International Patent Application Number PCT/EP2009/055846, filed on May 14, 2009, which claims priority of German Patent Application Number 10 2008 023 759.0, filed on May 15, 2008, and Provisional U.S. patent application Ser. No. 61/060,373, filed on Jun. 10, 2008, which are hereby incorporated by reference as if reproduced in their entirety herein.

FIELD OF THE INVENTION

The invention relates to a steering device for a motor vehicle, having a steering wheel, having a steering shaft and having a superposition gearing.

Superposition steering systems are characterized in that a steering angle input by a driver can have a further angle superposed on it by an actuator. DE 101 60 313 A1 discloses a superposition gearing which is arranged between an input shaft, which is connected to the steering wheel, and an output shaft, which is connected to a steering gear. WO 2007/009420 A1 describes a superposition gearing for a superposition steering system, in which the actuator for the superposition steering system is arranged in the steering wheel.

Superposition steering systems are used for example in a so-called dynamic steering system, in which the superposition of a steering angle takes place in a speed-dependent fashion.

There is a requirement to design steering devices with superposition gearings for permanent use.

SUMMARY

The present invention is based on the object of providing a steering device for a motor vehicle having a superposition gearing, which is suitable for permanent use and which, for this purpose, protects the superposition gearing from overloading.

According to an exemplary embodiment of the invention, at least one interface is provided which, in the presence of a defined condition, separates or limits a transmission of force between the steering shaft and the superposition gearing. The defined condition is for example the attainment or exceedance of a certain torque. By means of the solution according to the invention, the superposition gearing is protected from overloading, as can occur for example if the steering wheel is rotated with a large force despite the steering wheel locking arrangement being locked or if, when the motor vehicle is jacked up, the then freely movable wheels are pivoted and, in the process, a torque is transmitted to the superposition gearing via the steering shaft.

Here, the interface may on the one hand be designed and arranged such that, in the presence of a defined condition, a transmission of force between the steering shaft and the superposition gearing is limited. A limitation of force is sufficient to protect the superposition gearing. It may however likewise be provided that the interface is designed and arranged such that, in the presence of the defined condition, a transmission of force between the steering shaft and the superposition gearing is separated entirely, and there is therefore then no more force whatsoever transmitted via the superposition gearing.

In one exemplary refinement of the invention, the interface is embodied as an overload clutch. The interface may fundamentally also be designed in some other way, for example as an electrical device which, in the presence of the defined condition, actuates shift elements which separate or limit the transmission of force between the steering shaft and superposition gearing.

In one exemplary refinement, the overload clutch is designed so as to slip when a torque above a defined value acts on the overload clutch. For this purpose, said overload clutch has for example at least two clutch elements which are coupled to one another by means of a force-fitting press connection. Here, it is possible by means of the force-fitting action of the press connection to define the torque above which the overload clutch slips.

In one exemplary refinement, the interface is realized between a drive-output-side gearing element of the superposition gearing and the steering shaft or a part which is coupled to the steering shaft. The drive-output-side gearing element is for example a worm gear of a superposition gearing which is embodied as a worm gear mechanism.

It may also be provided that the interface comprises a clutch sleeve which is connected on the one hand to the drive-output-side gearing element of the superposition gearing and on the other hand to the steering shaft, with the clutch sleeve being connected to the drive-output-side gearing element by means of a press fit. The interface forms said press fit.

In a further exemplary refinement, the steering device also has an anti-theft device which is suitable for locking the steering shaft. For this purpose, a latching element which is arranged so as to be fixed with respect to the vehicle is for example provided, which latching element interacts with the steering shaft or with a sleeve which is rotationally fixedly connected to the steering shaft. Here, the interface is, in one refinement, formed between a drive-output-side gearing element of the superposition gearing and an element of the anti-theft device. A clutch sleeve which is directly or indirectly coupled to the drive-output-side gearing element of the superposition gearing is for example embodied as an element of the anti-theft device.

In one exemplary embodiment, a first and a second interface are provided, which have a first and a second clutch sleeve, with the first clutch sleeve being connected to a drive-output-side gearing element of the superposition gearing by means of a first press fit, the second clutch sleeve being connected to the first clutch sleeve by means of a second press fit, and the first clutch sleeve being rotationally fixedly connected to the steering shaft. Here, the second clutch sleeve is, in one refinement, embodied as an element of an anti-theft device. The use of two interfaces makes it possible to provide different torques at which the respective interfaces "switch".

With the simultaneous realization of an anti-theft device, it is possible, for example at the interface between the first clutch sleeve and drive-output-side gearing element, to provide a first torque of for example 250 Nm above which the superposition gearing is limited with regard to the force flow in the event of a torque being introduced by the wheels when the anti-theft device is unlocked. Here, when the anti-theft device is unlocked, no transmission of force takes place between the first and the second clutch sleeve. Furthermore, it is possible for a second torque of for example 100 Nm to be provided at the interface between the first and the second clutch sleeve, above which the steering wheel may turn when the anti-theft device is locked.

Here, it is generally the case that, where a plurality of interfaces, in particular a first and a second interface, are provided, said two interfaces can "switch" at different torques, that is to say the separation or limiting of a transmission of force between the steering column or an element which is fixed to the vehicle and the superposition gearing can take place in the presence of different torques. In this way, increased design freedom is provided with regard to the conditions under which the interfaces switch in each case.

In one exemplary refinement of the steering device, it is provided that a manual adjusting movement of the steering wheel is likewise transmitted via the superposition gearing to the steering shaft. For this purpose, it is for example provided that the superposition gearing is arranged in a gearing housing which is rotationally fixedly connected to the steering wheel, with a steering movement by a driver being transmitted, in the same way as a steering movement provided by means of the superposition gearing, to the steering shaft. It may now be provided in one embodiment variant that the interface is arranged and designed such that a force flow of said type via the superposition gearing takes place even in the presence of the defined condition. The interface according to the invention provides only a limitation of force. Said embodiment variant is provided in particular if the interface is embodied as a slipping clutch. Here, a rotation of the steering wheel is possible.

In a second exemplary embodiment variant, in contrast, it is provided that the interface is arranged and designed such that, in the presence of the defined condition, in contrast to the normal case, a direct transmission of force between the steering wheel and the steering shaft at least partially takes place. In said embodiment variant, the force flow is conducted directly into the steering shaft, bypassing the superposition gearing, at least above a certain torque. For this purpose, the interface is embodied for example as an overload clutch which provides a form-fitting and/or force-fitting connection directly between the steering wheel and the steering shaft when a torque above a defined value acts on the overload clutch.

The overload clutch may for example have spring-preloaded force-fitting and/or form-fitting connections, in particular also radially and/or axially acting springs. The springs used may comprise springs with a degressive spring characteristic.

The overload clutch is formed, in the second embodiment variant, for example between the gearing housing and a base body of the steering wheel. In the event of the overload clutch being disengaged, a direct transmission of torque, bypassing the superposition gearing, is provided between the base body of the steering wheel and the steering shaft.

In one exemplary refinement, the superposition gearing is arranged in the steering wheel, in particular in a gearing housing which is fastened to the steering wheel. The arrangement of the superposition gearing in the steering wheel serves to provide a compact overall arrangement.

BRIEF DESCRIPTION OF THE DRAWINGS

The invention is explained in more detail below with reference to the figures of the drawing on the basis of several exemplary embodiments.

DETAILED DESCRIPTION

Figure 1A:
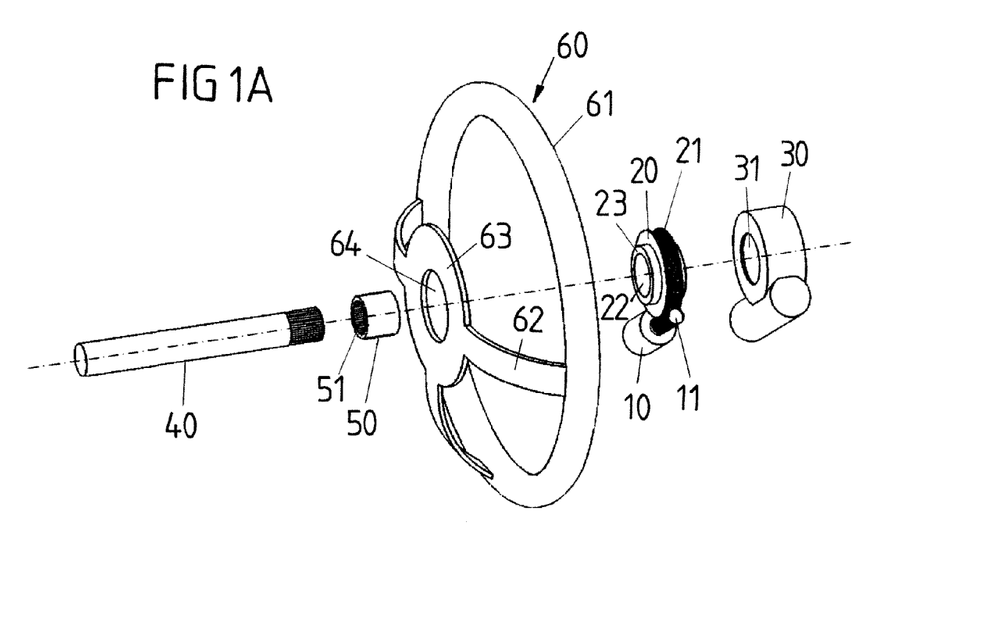
FIG. 1A shows an exploded illustration of a first exemplary embodiment of a steering device having a steering wheel, a steering shaft and a superposition gearing.
Figure 1B:
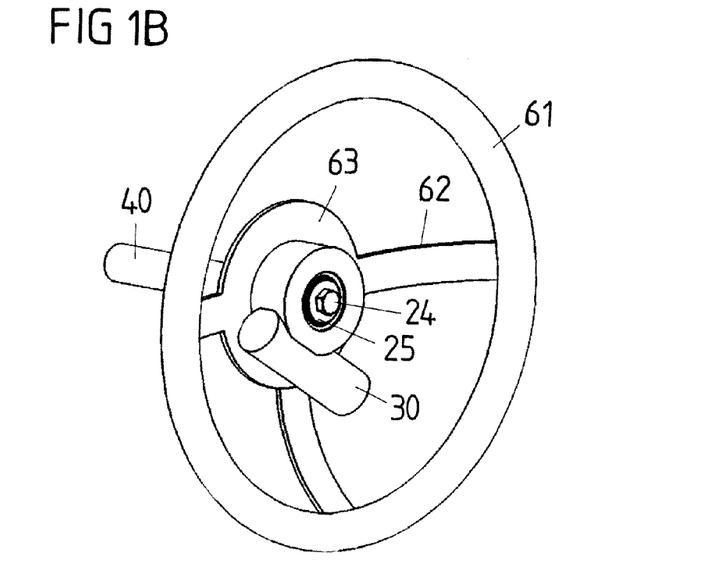
FIG. 1B shows the steering device from FIG. 1A in the assembled state.

FIGS. 1A, 1B show a first exemplary embodiment of a superposition gearing having a steering shaft 40, a steering wheel 60 and a superposition gearing which is suitable for superposing a further steering angle on a steering angle input by a driver. Here, the superposition gearing together with a drive motor forms an actuator of a superposition steering system.

In the exemplary embodiment of FIGS. 1A, 1B, the superposition gearing is embodied (though this is not imperative) as a worm gear mechanism with a drive worm 11 and a worm gear 20. The drive worm 11 is driven by an electric drive motor 10. The worm gear 20 has an external toothing 21 which meshes with the drive worm 11. The worm gear 20 also forms a sleeve 23 which protrudes at both sides beyond the worm gear 20. The worm gear 20 may however also be formed without a sleeve of said type.

The worm gear 20 has, in the center, an opening 22 which serves for coupling the worm gear 20 to the steering shaft 40, as will be explained below.

The worm gear 20 is a drive-output-side rotary gearing element of the superposition gearing which transmits a rotary movement, which is provided by the electric motor 10, to a drive element, specifically the steering shaft 40 or a coupling element which is connected thereto.

The steering shaft 40 is connected, in a manner known per se, to a steering gear (not illustrated). A servo motor of a servo steering system can also be coupled to the steering shaft 40. It is pointed out that the steering shaft 40 need not necessarily be formed as a cylindrical element. Within the context of the present description, the steering column refers to any element which transmits a rotary movement of the superposition gearing to a steering gear. It is also pointed out that the steering shaft 40 can be radially and/or axially mounted by means of mounting elements.

A clutch sleeve 50 having an axial opening 51 is provided for the rotational coupling of the steering shaft 40 to the worm gear 20 of the superposition gearing. The clutch sleeve is connected to the worm gear 20 by means of a press fit via the opening 22. Here, the sleeve 23 of the worm gear 20 provides an enlarged surface for the press fit. Furthermore, that end of the steering shaft 40 which faces toward the steering wheel 60 is rotationally fixedly fastened by means of its external toothing in the opening 51, which is provided with an internal toothing, of the clutch sleeve 50.

The press fit is realized by an overload clutch. In the presence of a defined condition, specifically in the presence of a defined switching torque, a transmission of force between the steering shaft 40 and the superposition gearing 20, 11 is limited because the force flow between the clutch sleeve 50 and worm gear 20 is nullified when the switching torque is attained, and the steering shaft 40 and steering wheel 60 rotate relative to one another.

In this way, it is obtained that a limitation of force takes place if a torque is present which exceeds a certain limit value, brought about for example by means of a manual adjusting movement of the steering wheel or by means of the introduction of a torque via the steering gear (for example when the vehicle is jacked up and a mechanic pivots the freely movable wheels of the jacked-up vehicle).

FIG. 1A also shows the steering wheel 60 which is composed of a steering wheel rim 61, a plurality of spokes 62 and a steering wheel base 63 which surrounds the steering wheel hub. Here, in the illustrated exemplary embodiment, three spokes 62 are illustrated, wherein said number is to be understood merely as an example. The steering wheel base 63 is formed substantially as a disk with a central opening 64. Other designs of the steering wheel base are however also possible. For example, the steering wheel base may have an encircling side wall which is aligned in the direction of the driver. Also illustrated in FIG. 1A is a gearing housing 30 with an opening 31. The gearing housing 30 is provided for holding the drive motor 10, the drive worm 11 and the worm gear 20 and serves to protect, cover and mount these. The drawing of the gearing housing 30 is to be understood merely as a diagrammatic illustration. The gearing housing is preferably of multi-part design and preferably has means for connecting the housing components to one another and for connecting the housing to the steering wheel.

FIG. 1B shows the assembled state. The steering shaft 40 is rotationally fixedly connected to the clutch sleeve 50. The detailed description is given in connection with FIGS. 2A to 2C. The clutch sleeve 50 is inserted by means of a press fit into the opening 22 of the worm gear 20. Here, the steering shaft 40 and the clutch sleeve 50 extend through the opening 64 of the steering wheel base 63. The gearing housing 30 is rotationally fixedly fastened to the steering wheel base 63. The steering movement of a driver is therefore transmitted, in the same way as a steering movement provided by the superposition gearing, via the worm gear 20 to the steering shaft 40. A steering movement by a driver and an associated rotation of the steering wheel base 63 and of the gearing housing 30 which is connected thereto thus leads to a rotation of the drive worm 11 about a steering axis which is identical to the longitudinal axis of the steering shaft 40, which rotation leads in turn to a rotation of the worm gear 20 and therefore to a transmission of the steering movement to the steering shaft 40. Likewise, an adjusting movement provided by means of the drive motor is transmitted via the drive worm 11, which rotates about its longitudinal axis, and the worm gear 20 to the steering shaft 40. This is enabled by means of the steering wheel 60 being mounted on the steering shaft 40 in such a way that the two parts can rotate relative to one another, such that an adjusting movement provided by means of the drive motor does not lead to a corresponding rotation of the steering wheel. A corresponding bearing arrangement is described in WO 2007/009420 A1.

FIG. 1B also shows a screw 24 which can be screwed into a central opening, which is provided with a screw thread, of the steering shaft 40, and which thereby secures the steering wheel 60 on the steering shaft 40. A washer 25 is provided under the head of the screw 24. The driver inputs a steering angle. This steering angle input by the driver can have a further angle superposed on it by means of the superposition gearing. Here, the steering performed by means of the superposition gearing can supplement or else entirely replace the manual steering by a driver. The drive motor 10 is controlled in a suitable manner by a control device (not illustrated) which receives input signals from one or more sensors.

Figure 2A:
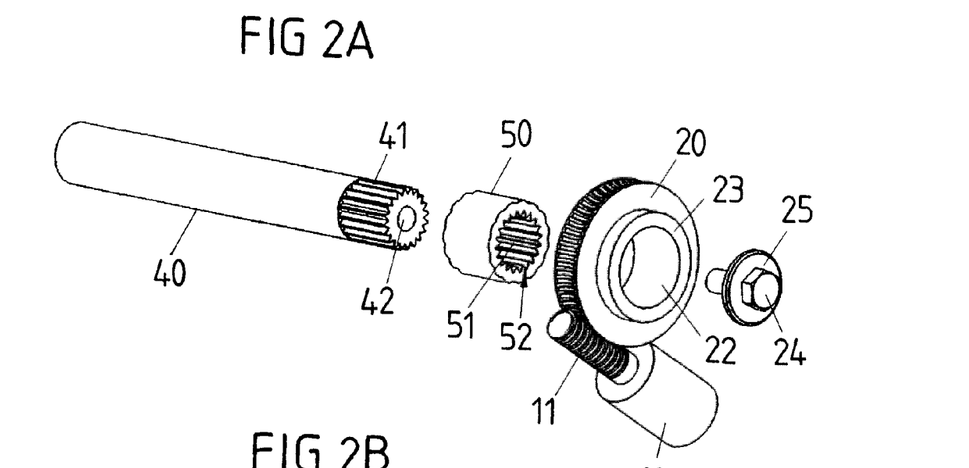
FIG. 2A shows a detailed exploded illustration of the superposition gearing from FIG. 1A.
Figures 2B, 2C:
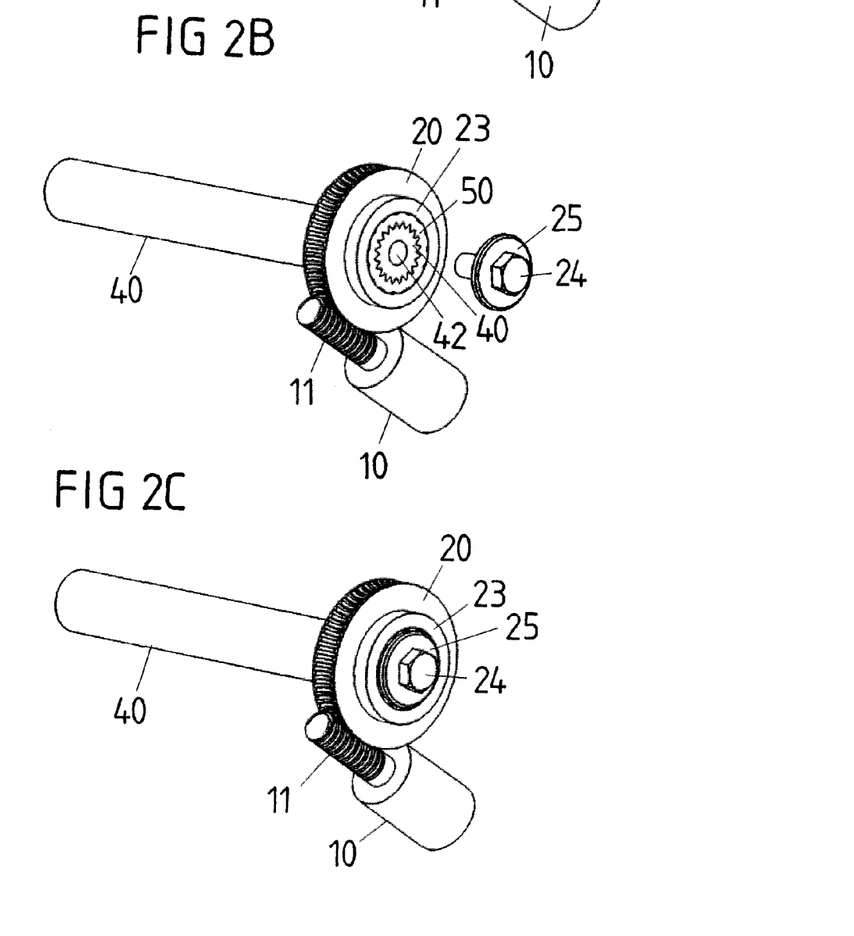
FIG. 2B shows the superposition gearing from FIG. 2A in a partially assembled state.
FIG. 2C shows the superposition gearing from FIG. 2A in the fully assembled state.

FIGS. 2A to 2C show the superposition gearing from FIGS. 1A, 1B with a detailed illustration of the rotationally fixed, form-fitting connection between the steering shaft 40 and the clutch sleeve 50. It is also pointed out that the steering wheel 60 and the gearing housing 30 are not illustrated in FIGS. 2A, 2B, 2C, but are of course likewise present in the assembled state.

As per FIG. 2A, the superposition gearing of the steering device is provided with a drive worm 11, which is connected to a drive motor 10, and a worm gear 20 with an external toothing 21, a sleeve 23 and a central opening 22. The steering shaft 40 has, at one end, a steering wheel pin with an external toothing 41 and with an end-side central bore 42 which is provided with a thread. The clutch sleeve 50 with the axial opening 51 is provided with an internal toothing 52.

FIG. 2B shows the partially assembled state. The steering wheel pin is inserted into the opening 51 of the clutch sleeve 50, with the external toothing 41 of the steering wheel pin coming into engagement with the internal toothing 52 of the clutch sleeve 50, so as to provide a form-fitting, non-slip (rotationally fixed) connection. The sleeve 50 is coupled to the worm gear 20 by means of a press fit via the opening 22.

In FIG. 2C, a screw 24 is screwed, using a washer 25, into the threaded bore 42 of the steering wheel pin, as a result of which the superposition gearing is fixed axially with respect to the steering shaft 40. Since the superposition gearing is arranged in a gearing housing and the latter is rotationally fixedly fastened, as described with regard to FIGS. 1A, 1B, to the steering wheel base 63 of the steering wheel 60, this also serves to provide fixing of the steering wheel 60 with respect to the steering shaft 40.

In the presence of a defined condition, for example in the event of the introduction of a torque with a value exceeding for example 100 Nm or 250 Nm, in the overload clutch formed by the worm gear 20, the clutch sleeve 50 and the steering shaft 40, the force flow is nullified at the press fit, such that the force transmitted between the steering shaft 40 and the superposition gearing is limited because these rotate relative to one another. In this way, the superposition gearing is protected from damage in the event of sudden high torques occurring.

Figure 3A:
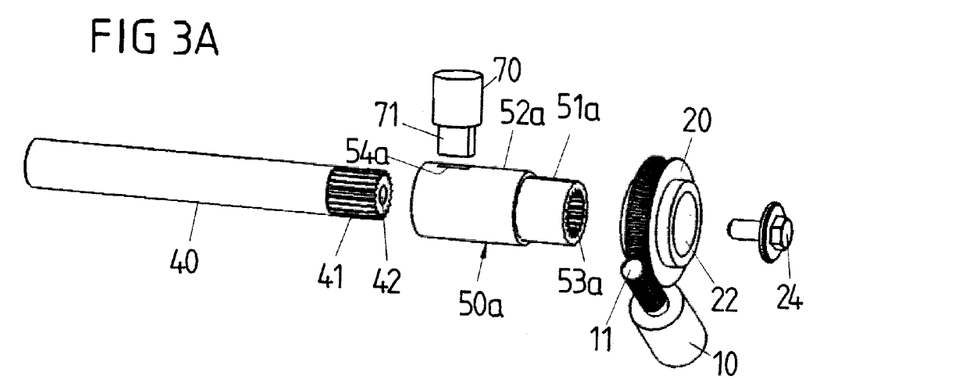
FIG. 3A shows an exploded illustration of the elements of a second exemplary embodiment of a steering device having a superposition gearing, with an anti-theft device additionally being provided.
Figure 3B:
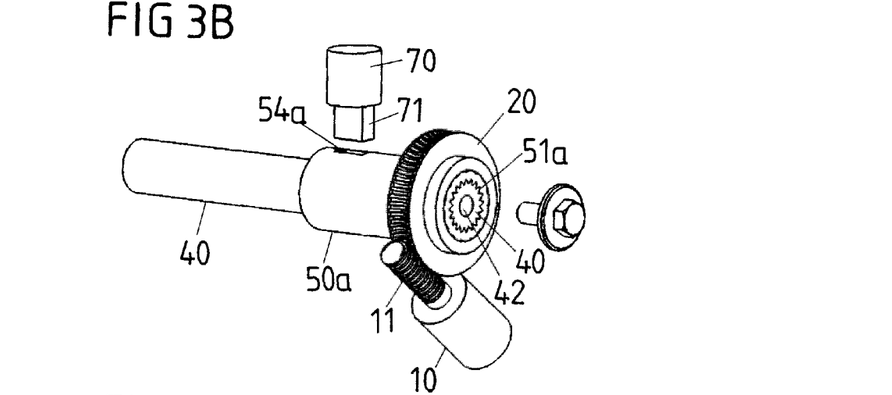
FIG. 3B shows the steering device from FIG. 3A in a partially assembled state.
Figure 3C:
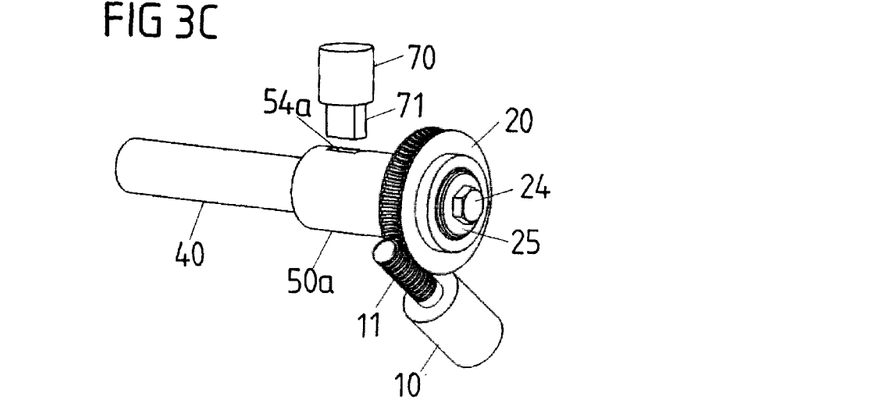
FIG. 3C shows the steering device from FIG. 3A in the fully assembled state.

FIGS. 3A, 3B, 3C show a further exemplary embodiment of a steering device having a superposition gearing. In this embodiment, an anti-theft device 70 is also provided.

With regard to the design of the superposition gearing 11, 20 and of the steering shaft 40, reference is made to the explanations regarding FIGS. 2A to 2C, which apply correspondingly. The design of FIGS. 3A, 3B, 3C differs from the design of FIGS. 2A, 2B, 2C by an anti-theft device 70 which interacts with a clutch sleeve 50a.

The clutch sleeve 50a has a first region 51a of relatively small diameter and a second region 52a of relatively large diameter, with the region 51a of relatively small diameter being seated, in the assembled state, by means of a press fit in the opening of the worm gear 20, and providing, together with the latter and the steering shaft 40, an overload clutch similar to the design of FIGS. 2A, 2B, 2C. Furthermore, the sleeve 50a has, at least in its region 51a of relatively small diameter, an internal toothing 53a which comes into engagement with an external toothing 41 of the steering shaft 40 when the steering shaft 40 is inserted into the sleeve 50a.

The region 52a of relatively large diameter of the clutch sleeve 50a has a longitudinal slot 54a which serves to receive a latching tooth 71 of the anti-theft device 70. Here, it is pointed out that the anti-theft device 70 is illustrated only incompletely. Said anti-theft device 70 is designed to move the latching tooth perpendicular to the longitudinal axis of the steering shaft 40, with the latching tooth 71 being movable between a locking position, in which it latches into the opening 54a, and an unlocked position. In the locking position, a rotation of the steering shaft 40 is blocked.

By means of the overload clutch, it is ensured that, in the event of a defined torque which acts on the overload clutch being exceeded, the transmission of force between the clutch sleeve 50a (and therefore the steering shaft 40) and the superposition gearing is limited. It may for example be provided that the force flow is nullified in the region of the press fit of the overload clutch, and the transmitted torque is thereby limited, above a torque of 100 Nm or 250 Nm. The superposition gearing is therefore protected from high torques even when the anti-theft device is activated. The mode of operation in the unlocked position of the anti-theft device 70 has already been explained in connection with FIGS. 1A to 2C.

FIGS. 3B and 3C show the partially and fully assembled states corresponding to FIGS. 2B, 2C.

Figure 4A:
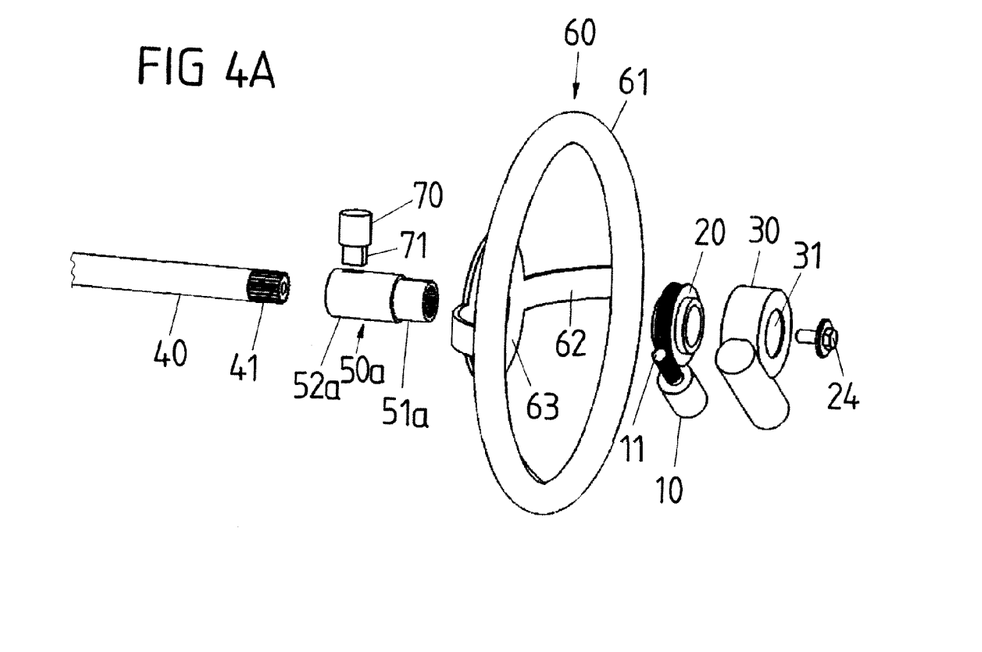
FIG. 4A shows the steering device from FIG. 3A in an exploded illustration with a steering wheel and a gearing housing.
Figure 4B:
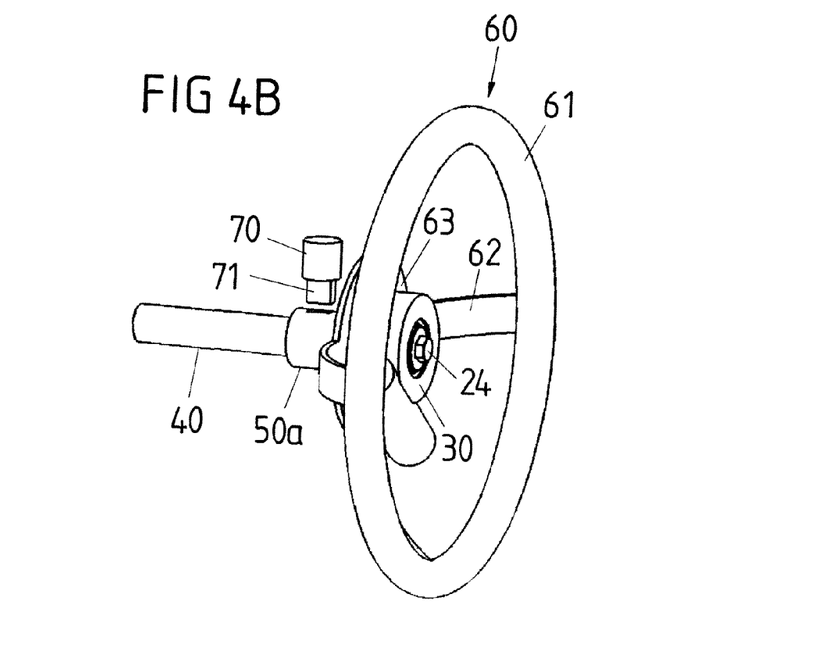
FIG. 4B shows the steering device from FIG. 4A in the assembled state.

FIGS. 4A, 4B show the steering device of FIGS. 3A, 3B, 3C together with a steering wheel 60, firstly in an exploded illustration and secondly in the assembled state. With regard to the fastening of the elements on the steering wheel, reference is made to the explanations given regarding FIGS. 1A, 1B.

Figure 5A:
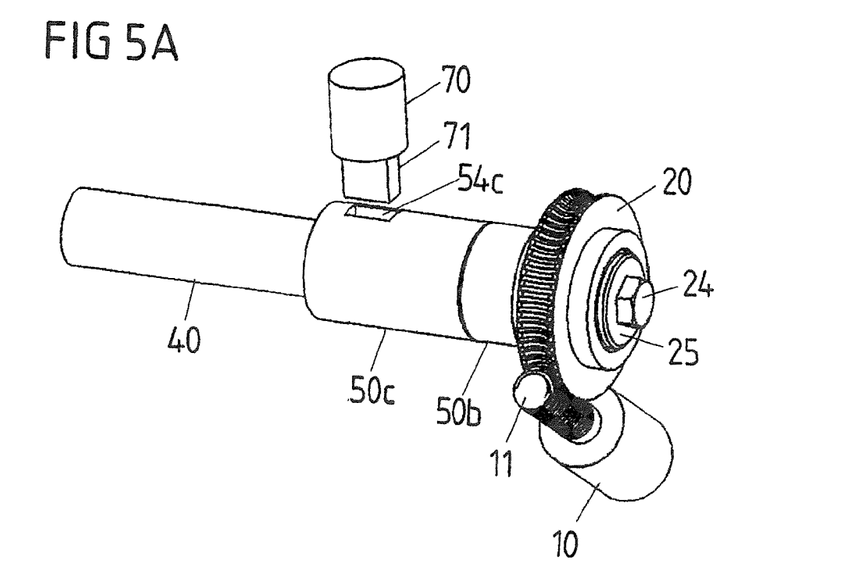
FIG. 5A shows, in the assembled state, a third exemplary embodiment of a steering device having a superposition gearing.
Figure 5B:
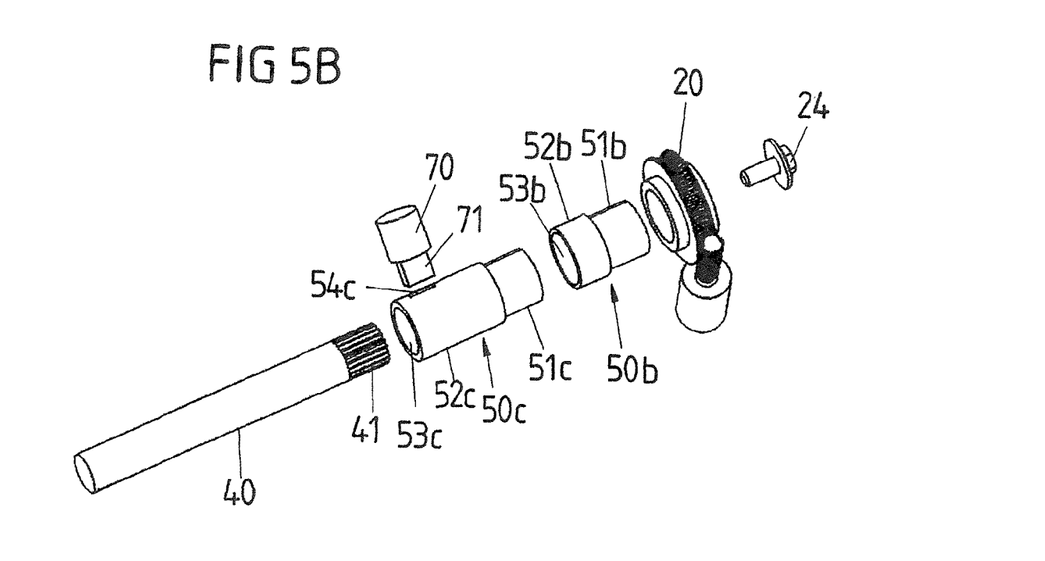
FIG. 5B shows an exploded illustration of the elements of the steering device from FIG. 5A.

FIGS. 5A and 5B illustrate a further exemplary embodiment. In said exemplary embodiment, two sleeves 50b, 50c are provided which are connected to one another. Each sleeve has a region 51b, 51c of relatively small outer diameter and a region 52b, 52c of relatively large outer diameter. The region of relatively small diameter 51b of the first sleeve 50b is arranged by means of a press fit in the opening 22 of the worm gear 20. The region of relatively small diameter 51c of the second clutch sleeve 50c is coupled by means of a press fit to the region of relatively large diameter 52b of the first clutch sleeve 50b, and is for this purpose inserted into the opening 53b of the first sleeve 50b. The end of the steering shaft 40 is inserted into the opening 53b of the first sleeve 50b, with an external toothing 41 being in engagement with an internal toothing (not illustrated) which is formed at least in the region 51b of the first sleeve 50b, such that the steering shaft 40 is rotationally fixedly connected to the first sleeve 50b. The second sleeve 50c also has a longitudinal slot 54c which serves to receive a latching tooth 71 of an anti-theft device 70, corresponding to the design of FIGS. 3A, 3B, 3C.

A total of two interfaces are therefore provided, which interfaces are each embodied as overload clutches with force-fitting press connections.

It may be provided that the force flow is nullified at a different torque at the press fit between the first clutch sleeve 50b and the actuator output, that is to say the drive-output-side gearing element 20 (overload clutch 1), than at the press fit between the second clutch sleeve 50c and the first clutch sleeve 50b (overload clutch 2). The torque for switching the overload clutch 1 is for example 250 Nm, while the torque for switching the overload clutch 2 is for example 100 Nm. Here, "switching" means that the overload clutch is active and a transmission of force is separated or limited.

Under the stated conditions, when the anti-theft device 70 is in its unlocked position, in the event of the defined torque of 250 Nm being exceeded, the transmission of force is separated at the overload clutch 1, since the second clutch sleeve 50c can freely co-rotate. If the anti-theft device 70 is in contrast in its locking position, in the event of the defined torque of 100 Nm being exceeded, the transmission of force is separated at the overload clutch 2. This means that steering the vehicle would not be possible above the stated torque, since no interruption in the force flow between the steering shaft 40 and the steering wheel 60 takes place. The provision of an overload clutch 2 of such design is intended to prevent damage in the region of the anti-theft device in the event of the latter being overcome by brute force. The specified values for the torques are to be understood merely as examples. It is essential in this embodiment that the torque for "switching" at the overload clutch 1 is greater than at the overload clutch 2.

It is pointed out that, in the exemplary embodiment described above, the overload clutch provided in each case limits a transmission of force between the superposition gearing and the steering shaft by virtue of rotatability or slipping being provided once a certain torque is present. Here, the force flow always takes place via the worm gear mechanism. The force flow via the worm gear mechanism is limited by the slipping or rotatability provided by the overload clutch, as a result of which the superposition gearing is protected from damage in the event of high torques occurring.

In other embodiment variants, it is provided that the overload clutch, when activated, separates the force flow by means of the worm gear mechanism, and a direct connection of the steering wheel to the steering shaft is provided. For this purpose, it is possible to provide in particular radially or axially acting spring-preloaded force-fitting and/or form-fitting connections. In said embodiment variants, the overload clutch leads, when triggered, to the force flow being conducted entirely or partially past the superposition gearing and a direct connection being provided between the steering wheel or a steering wheel base body and the steering shaft.

Figure 6A:
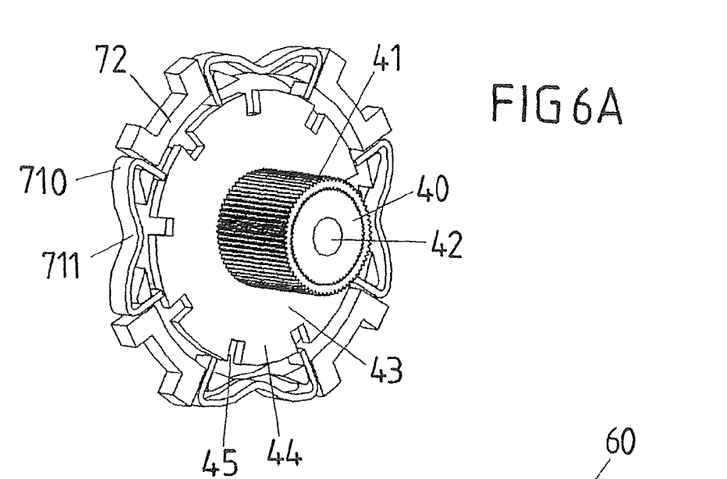
FIG. 6A shows an overload clutch, which interacts with a steering shaft plate, with radially acting clamping springs.
Figure 6B:
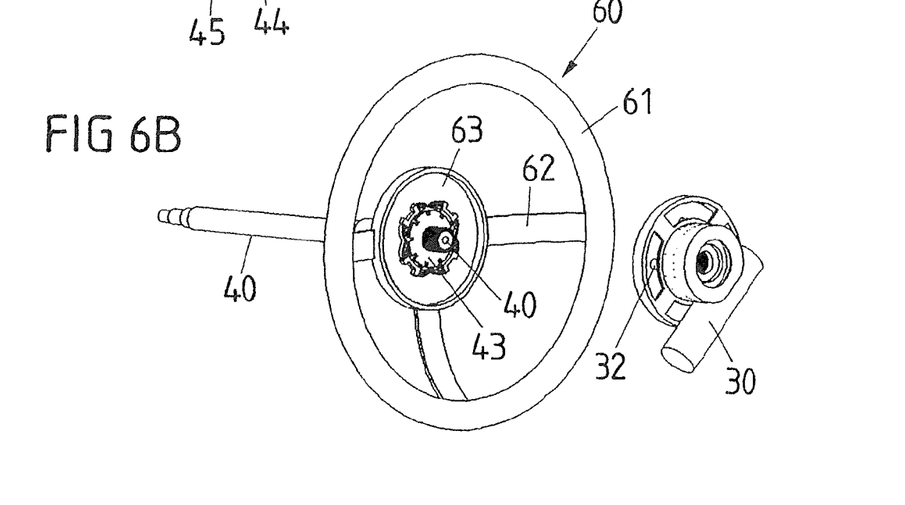
FIG. 6B shows a steering device having a steering wheel, a steering shaft, a superposition gearing and an overload clutch as per FIG. 6A.
Figure 6C:
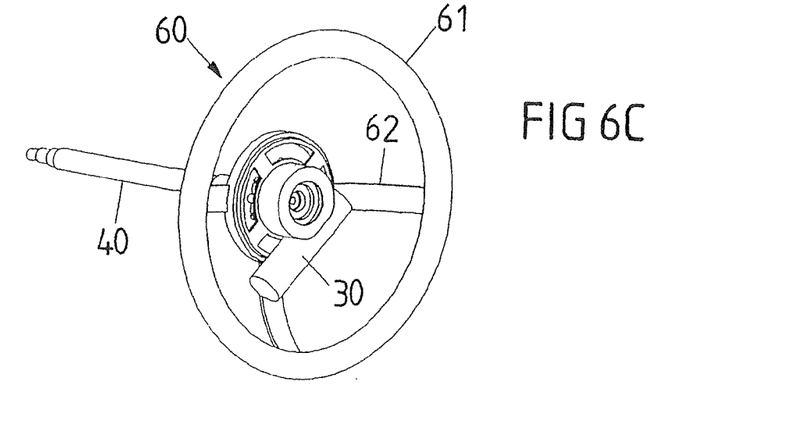
FIG. 6C shows the steering device of FIG. 6B in the assembled state.

FIGS. 6A, 6B, 6C show an exemplary embodiment of a steering device having an overload clutch with radially acting spring elements. It is correspondingly possible to provide axially acting spring elements or an eccentric which interacts with the spring elements and which is formed on the gearing housing.

As per FIG. 6A, the one end of the steering shaft 40 has an external toothing 41, a central bore 42 and a steering shaft plate 43 which is rotationally fixedly connected to the steering shaft 40 and which is spaced apart axially from the end side of the steering shaft. The plate 43 forms, at its periphery, claws 44 and interposed radial cutouts 45. Also provided are a plurality of radially acting clamping springs 71 which are arranged, in an alternating fashion with U-shaped guide elements 72, along a periphery of the plate 43.

The guide elements 72 are coupled, at any rate after the fastening of the gearing housing 30 as per FIGS. 6B, 6C, to the steering wheel base 63. Alternatively, the guide elements 72 may be an integral part of the steering wheel base 63. The gearing housing 30, which in this embodiment is arranged so as to be rotatable relative to the steering wheel 60, has, at its side facing toward the steering wheel base 63, projections 32 which have a defined pivoting radius with respects to the pivot axis. The projections 32 are in engagement with the clamping springs 710, specifically in the unloaded state in the region of a central indentation 711. In the event of a torque occurring which exceeds a predefined value, the steering wheel 60 and gearing housing 30, and therefore also the steering wheel plate 43, rotate relative to one another. The projections 32 press in each case one of the ends of the clamping spring 710, in each case by means of the oblique portions running to the right and left of the central indentation 711, into the radial cutouts 45 of the plate 43. This has the result that a direct force flow is provided from the steering wheel base 63 into the steering shaft 40, and an additionally introduced torque is conducted past the gearing housing 30 and the superposition gearing.

In a further refinement (not illustrated), the overload clutch is formed in the manner of a plate spring which is situated axially between the gearing housing and the steering shaft plate. Beyond a certain rotation, the spring comes into contact by means of latching elements with the steering shaft plate, whereupon a direct force flow takes place again between the steering wheel and the steering shaft.

In a further refinement (not illustrated), a protruding surface which is eccentric with respect to the rotational axis is provided on the underside of the gearing housing, which surface engages into a corresponding eccentric cutout of the steering wheel base. In the event of an overload occurring, the steering wheel base is pushed to one side or the other, whereupon a direct transmission of force takes place between the steering wheel base and the steering shaft by means of positively locking elements, for example in the form of a toothing.

Figure 7:
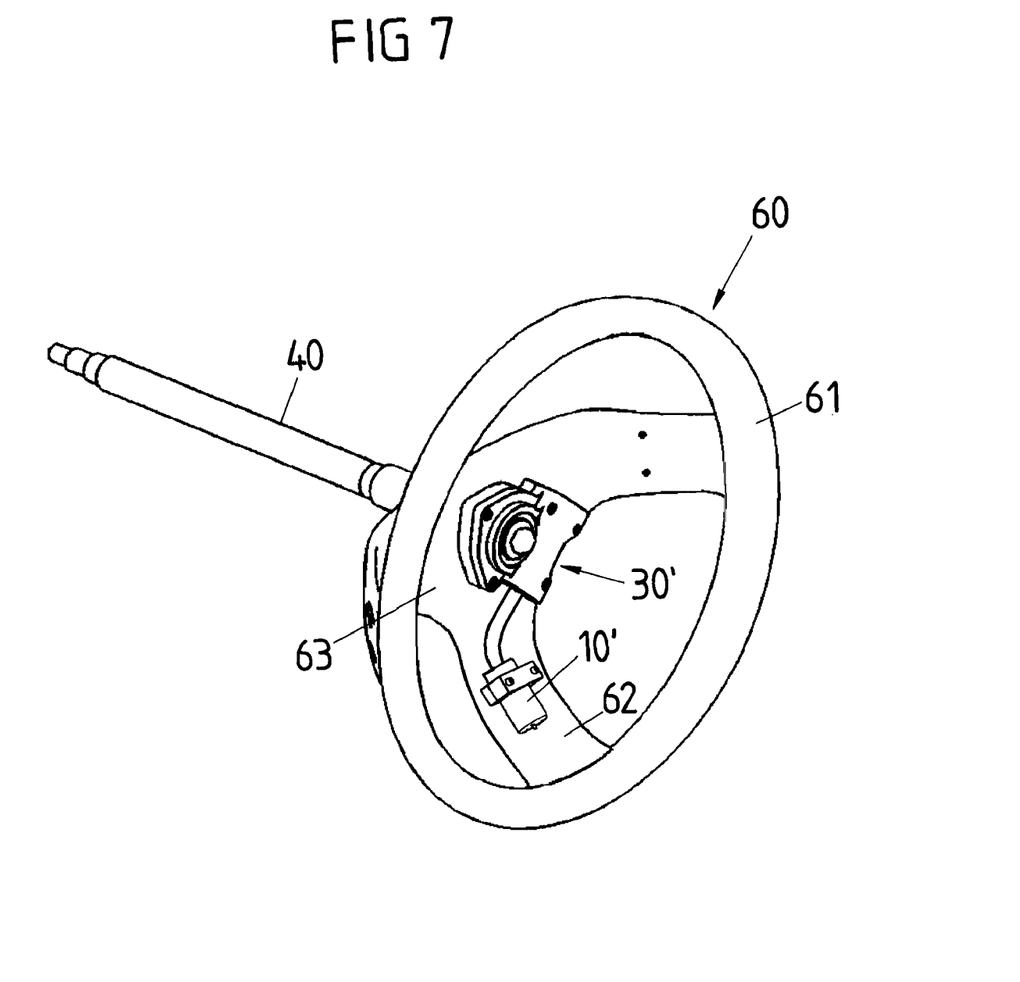
FIG. 7 shows a steering device in which the drive motor is arranged spatially separate from the gearing housing on the steering wheel.

FIG. 7 shows a steering device in which, in contrast to FIGS. 1A to 6C, in which the drive motor is arranged together with the gearing elements in or on the gearing housing, the drive motor 10' is arranged spatially separate from the gearing housing 30' on the steering wheel. This can be advantageous for space reasons in the event of limited installation space being available. The drive motor 10' is for example accommodated, by way of suitable fastening means, in the region of a spoke 62 corresponding to FIG. 7. In such a case, the rotational axes of the drive motor 10' and of the drive worm or of some other input-side gearing element of the superposition gearing will generally not run coaxially. Rigid connections are therefore not possible for transmitting torques. In fact, a connection between the drive motor 10' and the gearing is provided which compensates the axial offset, for example using a flexible shaft, a flexible coupling or an articulated shaft.

The spatially separate arrangement of the drive motor can be realized in all of the described exemplary embodiments.

The invention is not restricted in terms of its design to the above-illustrated exemplary embodiments; these are to be understood merely as examples. Other forms of overload clutches may for example be provided. It is likewise possible for the number of overload clutches, and for the location at which the overload clutches are formed, to differ from the exemplary embodiments. Furthermore, the superposition gearing and the steering wheel including the steering wheel base may be formed in some other way. It is for example possible for a superposition gearing having two drive worms and two drive motors to be provided.

The invention claimed is:

1. A steering device for a motor vehicle, the steering device comprising:
    a steering wheel;
    a steering shaft;
    a superposition gearing; and
    at least one interface between the steering shaft and the superposition gearing;
    wherein the superposition gearing is arranged in or on the steering wheel and which is configured to transmit a motor-driven adjusting movement to the steering shaft;
    wherein the steering wheel and the steering shaft are configured to be rotatable relative to one another;
    and wherein the at least one interface, in the presence of a defined condition, separates or limits a transmission of force between the steering shaft and the superposition gearing.

2. The steering device according to claim 1, wherein the interface is arranged between a drive-output-side gearing element of the superposition gearing and the steering shaft or a part which is coupled to the steering shaft.

3. The steering device according to claim 2, wherein the interface comprises a clutch sleeve which is connected to the drive-output-side gearing element of the superposition gearing and to the steering shaft, with the clutch sleeve being connected to the drive-output-side gearing element by means of a press fit.

4. The steering device according to claim 3, wherein the clutch sleeve is an element of an anti-theft device.

5. The steering device according to claim 4, wherein the clutch sleeve has a latching opening into which a latching element of the anti-theft device can be latched.

6. The steering device according to claim 3, wherein the steering shaft is rotationally fixedly connected to the clutch sleeve.

7. The steering device according to claim 1, wherein the interface is an overload clutch.

8. The steering device according to claim 7, wherein the overload clutch is configured so as to slip when a torque above a defined value acts on the overload clutch.

9. The steering device according to claim 7, wherein the overload clutch has at least two clutch elements which are coupled to one another by means of a force-fitting press connection.

10. The steering device according to claim 1, wherein the steering device also has an anti-theft device which is suitable for locking the steering shaft.

11. The steering device according to claim 10, wherein the interface is arranged between a drive-output-side gearing element of the superposition gearing and an element of the anti-theft device.

12. The steering device according to claim 1, wherein a first and a second interface are provided, which, in the presence of different torques, separate or limit a transmission of force between the steering shaft and the superposition gearing.

13. The steering device according to claim 1, wherein a first and a second interface are provided, which have a first and a second clutch sleeve, with
    the first clutch sleeve being connected to a drive-output-side gearing element of the superposition gearing by means of a first press fit,
    the second clutch sleeve being connected to the first clutch sleeve by means of a second press fit, and
    the second clutch sleeve being rotationally fixedly connected to the steering shaft.

14. The steering device according to claim 13, wherein the second clutch sleeve is an element of an anti-theft device.

15. The steering device according to claim 1, wherein the steering device is configured such that a manual adjusting movement of the steering wheel is transmitted via the superposition gearing to the steering shaft, with the interface being arranged and designed such that this is also the case in the presence of the defined condition.

16. The steering device according to claim 1, wherein the steering device is configured such that, in conditions other than the defined condition, a manual adjusting movement of the steering wheel is generally transmitted via the superposition gearing to the steering shaft, with the interface being arranged and configured such that, in the presence of the defined condition, a direct transmission of force between the steering wheel and the steering shaft at least partially takes place.

17. The steering device according to claim 16, wherein an overload clutch is configured so as to provide a form-fitting and/or force-fitting connection directly between the steering wheel and the steering shaft when a torque above a defined value acts on the overload clutch.

18. The steering device according to claim 17, wherein the superposition gearing is arranged in a gearing housing which is rotationally fixedly connected to the steering wheel.

19. The steering device according to claim 18, wherein a drive motor is arranged spatially separate from the gearing housing of the superposition gearing in or on the steering wheel.

20. The steering device according to claim 17, wherein the overload clutch has spring-preloaded force-fitting and/or form-fitting connections.

21. A steering device for a motor vehicle, the steering device comprising:
- a steering wheel;
- a steering shaft;
- a superposition gearing; and
- at least one interface between the steering shaft and the superposition gearing;
- wherein the superposition gearing is arranged in or on the steering wheel and which is configured to transmit a motor-driven adjustment movement to the steering shaft;
- wherein the at least one interface, in the presence of a defined condition, separates or limits a transmission of force between the steering shaft and the superposition gearing;
- wherein the interface comprises a clutch sleeve which is connected to a drive-output-side gearing element of the superposition gearing and to the steering shaft, with the clutch sleeve being connected to the drive-output-side gearing element by means of a press fit;
- wherein the clutch sleeve is an element of an anti-theft device.

22. The steering device according to claim 21, wherein the clutch sleeve has a latching opening into which a latching element of the anti-theft device can be latched.

* * * * *

UNITED STATES PATENT AND TRADEMARK OFFICE
CERTIFICATE OF CORRECTION

| | | |
|---|---|---|
| PATENT NO. | : 8,230,964 B2 | Page 1 of 1 |
| APPLICATION NO. | : 12/865832 | |
| DATED | : July 31, 2012 | |
| INVENTOR(S) | : Dieter Markfort | |

It is certified that error appears in the above-identified patent and that said Letters Patent is hereby corrected as shown below:

In the claims

Claim 1, Column 10, line 13, delete "adjusting" and insert --adjustment--.

Signed and Sealed this
Twenty-fourth Day of November, 2015

Michelle K. Lee
*Director of the United States Patent and Trademark Office*